(12) United States Patent
Fan et al.

(10) Patent No.: US 7,735,075 B2
(45) Date of Patent: Jun. 8, 2010

(54) SYSTEM AND METHOD FOR A PSEUDO DYNAMIC LINK LIBRARY (DLL) LINKER FOR A MONOLITHIC IMAGE IN A WIRELESS DEVICE

(75) Inventors: Guoxin Fan, Plano, TX (US); Vani Budhati, Garland, TX (US); Roger Ingles, North Richland Hills, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1178 days.

(21) Appl. No.: 11/334,600

(22) Filed: Jan. 18, 2006

(65) Prior Publication Data

US 2007/0130565 A1    Jun. 7, 2007

Related U.S. Application Data

(60) Provisional application No. 60/741,334, filed on Dec. 1, 2005.

(51) Int. Cl.
*G06F 9/44* (2006.01)
*G06F 9/445* (2006.01)

(52) U.S. Cl. .................. 717/162; 717/168; 717/169

(58) Field of Classification Search .......... 717/162–170
See application file for complete search history.

(56) References Cited

U.S. PATENT DOCUMENTS

| | | | | |
|---|---|---|---|---|
| 5,193,191 | A * | 3/1993 | McKeeman et al. | 717/162 |
| 5,303,379 | A * | 4/1994 | Khoyi et al. | 717/166 |
| 5,623,604 | A * | 4/1997 | Russell et al. | 717/167 |
| 5,701,491 | A * | 12/1997 | Dunn et al. | 717/167 |
| 5,822,787 | A * | 10/1998 | Zucker | 711/213 |
| 5,938,766 | A | 8/1999 | Anderson et al. | |
| 6,002,876 | A * | 12/1999 | Davis et al. | 717/162 |
| 6,079,015 | A | 6/2000 | Harwood, III et al. | |
| 6,240,550 | B1 * | 5/2001 | Nathan et al. | 717/169 |
| 6,298,481 | B1 * | 10/2001 | Kosaka et al. | 717/110 |
| 6,343,378 | B1 * | 1/2002 | Moroda | 717/162 |
| 6,684,395 | B2 * | 1/2004 | Johnson et al. | 717/162 |
| 6,698,016 | B1 * | 2/2004 | Ghizzoni | 717/162 |

(Continued)

FOREIGN PATENT DOCUMENTS

WO    WO 2005/040988 A2    5/2005

(Continued)

OTHER PUBLICATIONS

Boukerche et al, "A real time transport protocol for image based rendering over heterogenpus wireless networks", ACM MSWiM, pp. 333-340, 2005.*

(Continued)

*Primary Examiner*—Anil Khatri (57) ABSTRACT

The present disclosure relates generally to a system and method for a pseudo DLL linker. In one example, the method includes identifying a plurality of components forming an image and identifying all symbols exportable from each component and all symbols imported by each component from another component. A redirection mechanism is built containing an address of each symbol exported by a component that is imported by another component, and each component is modified to alter each direct reference to a symbol associated with another component to a reference to the redirection mechanism. A linker is called to link a final image based on the modified components.

22 Claims, 6 Drawing Sheets

U.S. PATENT DOCUMENTS

| | | | | |
|---|---|---|---|---|
| 6,701,356 B1 * | 3/2004 | Condict et al. | ............... | 709/220 |
| 7,080,371 B1 * | 7/2006 | Arnaiz et al. | ............... | 717/170 |
| 7,089,270 B2 * | 8/2006 | Ren et al. | ................... | 707/203 |
| 7,155,710 B2 * | 12/2006 | Breckner et al. | ............ | 717/168 |
| 7,266,805 B2 * | 9/2007 | Weidman et al. | ............ | 717/101 |
| 7,376,945 B1 * | 5/2008 | Kakumani et al. | .......... | 717/171 |
| 7,458,073 B1 * | 11/2008 | Darling et al. | .............. | 717/168 |
| 7,565,649 B2 * | 7/2009 | Sasabe | ....................... | 717/168 |
| 7,581,217 B2 * | 8/2009 | Jhanwar et al. | ............. | 717/168 |
| 2005/0216537 A1 | 9/2005 | Jiang et al. | | |

FOREIGN PATENT DOCUMENTS

WO     WO 2005/074621 A2     8/2005

OTHER PUBLICATIONS

Wagner et al, "Web services selection for distributed composition of multimedia content", ACM MM, pp. 104-107, 2004.*

Boukerche et al, "QoS based JPEG images transmission protocol for wireless CDMA communication systems", ACM WMuNeP, pp. 38-45, 2005.*

Dunkeis et al, "Run time dynamic linking for reprogramming wireless sensor networks", ACM SenSys, pp. 15-28, 2006.*

Cobodi et al, "Dynamic scheduling and clustring in symbolic image computation", IEEE Date, pp. 1-7, 2002.*

Traina et al, "Image domain formalization for content based image retrieval", ACM SAC, pp. 604-609, 2005.*

Hunt, "A Java framework for experimentation with steganography", ACM SIGCSE, pp. 282-286, 2005.*

European Search Report dated Jan. 28, 2009 in connection with European Patent Application No. EP 06 12 5266.

* cited by examiner

FIG.7

SYSTEM AND METHOD FOR A PSEUDO DYNAMIC LINK LIBRARY (DLL) LINKER FOR A MONOLITHIC IMAGE IN A WIRELESS DEVICE

CROSS-REFERENCE

This application claims priority from U.S. Provisional Patent Ser. No. 60/741,334, filed on Dec. 1, 2005, and entitled "SYSTEM AND METHOD FOR A PSEUDO DLL LINKER", which is incorporated herein by reference.

This application is related to U.S. Patent Application Ser. No. 11/333,847, filed on Jan. 13, 2006, and entitled "SYSTEM AND METHOD FOR A PATCH MINIMIZATION TOOL", which claims priority from U.S. Provisional Patent Ser. No. 60/741,322, filed Dec. 1, 2005, both of which are incorporated herein by reference.

BACKGROUND

Handsets and other wireless devices contain software in the form of executable instructions and non-executable data stored in a memory. The software provides such devices with the ability to perform various functions, such as communicate via a wireless network, handle call features such as call waiting and call forwarding, and maintain a calendar and address book.

However, once a wireless device is provided to an end user, it becomes difficult to provide additional software or to make corrections to the software already installed on the device. To address this problem, firmware over the air (FOTA) was developed to enable a service provider to send software updates over a wireless network to a wireless device. Such updates may provide additional functionality to software already existing on the wireless device or may provide bug fixes to address problems with the existing software. However, while an update process such as FOTA presents a way to send software to a wireless device, using such an update process is not without problems. Accordingly, the provision of software over an air interface to a wireless device is challenging.

SUMMARY

In one embodiment, a method for providing a monolithic image for use in a wireless device is provided. The method comprises identifying a plurality of components forming an image represented in machine code and, for each component of the plurality of components, building an export symbol list containing all symbols within the component that are accessible to other components and an import symbol list containing all symbols within other components that are needed by the component. The method also includes building a redirection mechanism containing an indirect reference to each symbol in each component's export symbol list that is in the import symbol list of at least one other component. For each component of the plurality of components, each direct reference to a symbol in another component is altered to refer to the indirect reference associated with the symbol in the redirection mechanism, but references internal to a component are not altered. A final image is created containing the altered components and the redirection mechanism.

In another embodiment, a method for providing an executable image for a mobile device is provided. The method comprises receiving an image from an assembler and identifying a plurality of components forming the image. All symbols exportable from each component and all symbols imported by each component from another component are identified. A redirection mechanism is built containing an address of each symbol exported by a component that is imported by another component, and each component is modified to alter each direct reference to a symbol associated with another component to a reference to the redirection mechanism. A linker is called to link a final image based on the modified components.

In yet another embodiment, a method comprises building at least first and second components from a plurality of modules forming an image received in machine language code. An export symbol list and an import symbol list are built for each of the first and second components. The first component's export symbol list is compared with the second component's import symbol list and the second component's export symbol list is compared with the first component's import symbol list to identify any symbols that are on the export list of one of the first and second components and the import list of the other of the first and second components. A redirection mechanism is built containing a location of each identified symbol. The first component is modified to change each reference to an export symbol of the second component to a reference to the redirection mechanism and the second component is modified to change each reference to an export symbol of the first component to a reference to the redirection mechanism.

In still another embodiment, a static monolithic image for a mobile device that is controlled by an operating system that does not support dynamic linking or dynamic sharing is provided. The image comprises at least one redirection mechanism containing an address of each symbol within the image that is imported by any component forming the image from any other component forming the image. The image also includes a plurality of components, wherein each component has a direct reference to any symbol contained by the component itself, and has a reference to the redirection mechanism for any symbol imported from another component.

In another embodiment, a system comprises a processor, a memory unit coupled to the processor, and a plurality of instructions stored on the memory unit for execution by the processor. The instructions include instructions for converting a monolithic image for use with a wireless device from assembly code to machine code and building a plurality of components based on modules identified in the machine code. The instructions also include instructions for identifying each symbol exportable by each component and each symbol imported by each component and building a redirection mechanism containing every symbol that is exportable by one component and imported by another component. The instructions also include instructions for modifying each component to alter each reference to an export symbol associated with another component to a reference to the redirection mechanism, and linking the modified components and the redirection mechanism to create a final version of the monolithic image.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
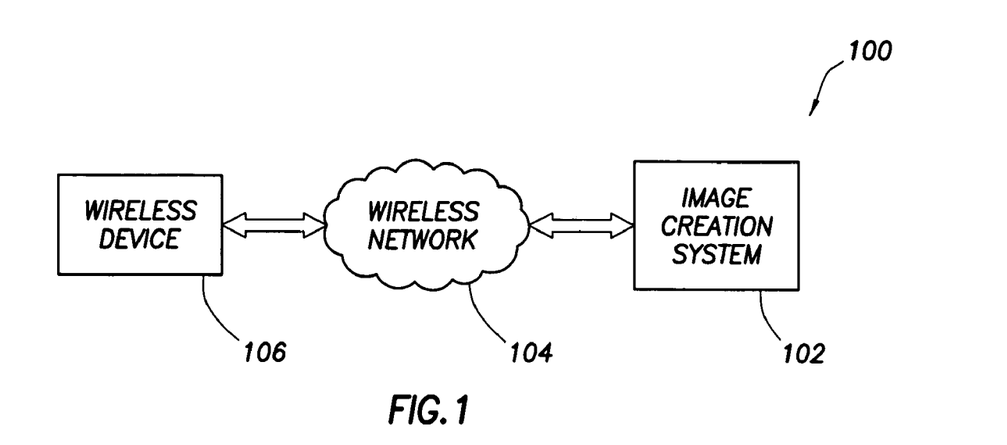
FIG. 1 is a diagram of one embodiment of a system within which the present invention may be practiced.

Referring to FIG. 1, one embodiment of a system 100 within which the present invention may be practiced is illustrated. The system 100 includes an image creation system 102, a wireless network 104, and a wireless device 106. As will be described below in greater detail, the image creation system 102 provides functionality to create an image containing executable instructions and/or data. The image is transferred via the wireless network 104 to the wireless device 106. The wireless device 106 then uses the image to provide functionality to a user and communicate with other devices via the wireless network 104. The image may contain various combinations of functionality and data, and additional features and bug fixes may be used to update the image by the image creation system 102. The network 104 may be any type of network, including centralized and ad hoc networks, and may use any type of network technology, including Code Division Multiple Access (CDMA), Global System for Mobile communication (GSM), Orthogonal Frequency Division Multiplexing (OFDM), or similar communications technologies. In the present example, the network is a packet-based network, but it is understood that the present disclosure applies to any type of transmission.

Figure 2:
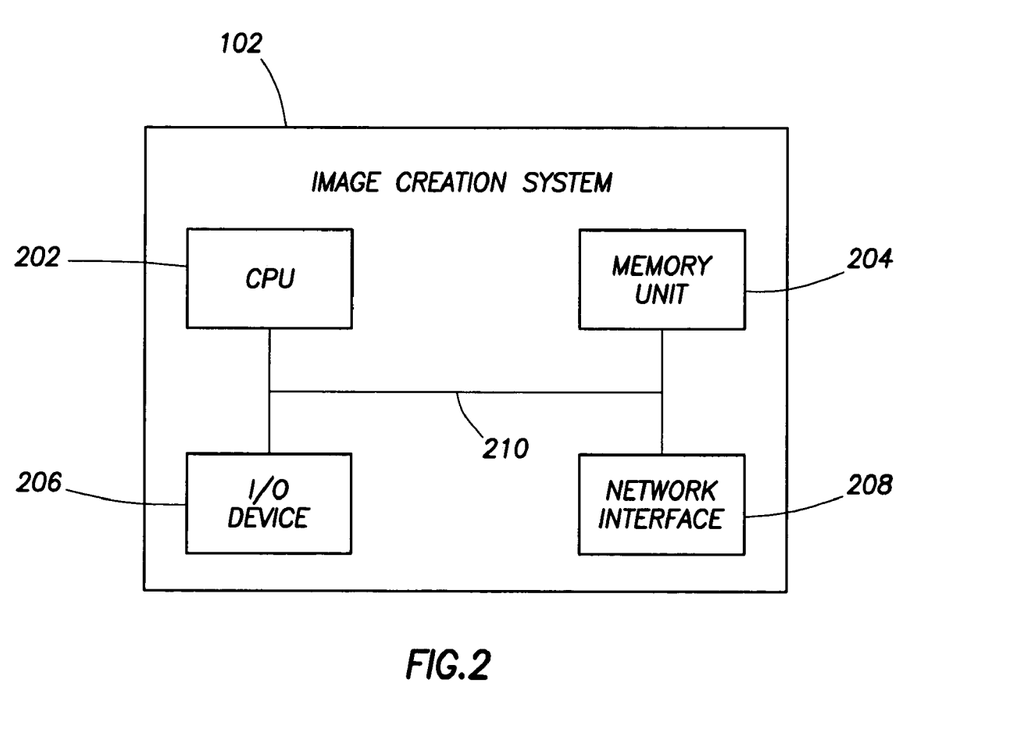
FIG. 2 is a block diagram of one embodiment of an image creation system that may be used with the system of FIG. 1.

Referring to FIG. 2, a computer is illustrated as one embodiment of the image creation system 102 of FIG. 1. The computer 102 may include a central processing unit ("CPU") 202, a memory unit 204, an input/output ("I/O") device 206, and a network interface 208. The network interface 208 may be, for example, one or more wireless and/or wireline network interface cards (NICs) that are each associated with a media access control (MAC) address. The network interface 208 may be coupled directly to the network 104 or may be coupled via one or more other networks (not shown). The components 202, 204, 206, and 208 are interconnected by a bus system 210.

It is understood that the computer 102 may be differently configured and that each of the listed components may actually represent several different components. For example, the CPU 202 may represent a multi-processor or a distributed processing system; the memory unit 204 may include different levels of cache memory, main memory, hard disks, and remote storage locations; and the I/O device 206 may include monitors, keyboards, and the like. Furthermore, although shown within the computer 102, it is understood that some components (e.g., a keyboard) may be physically located outside of the computer. In addition, some or all of the components 202, 204, 206, and 208 may be distributed. Therefore, a wide range of flexibility is anticipated in the configuration of the computer 102.

Figure 3:
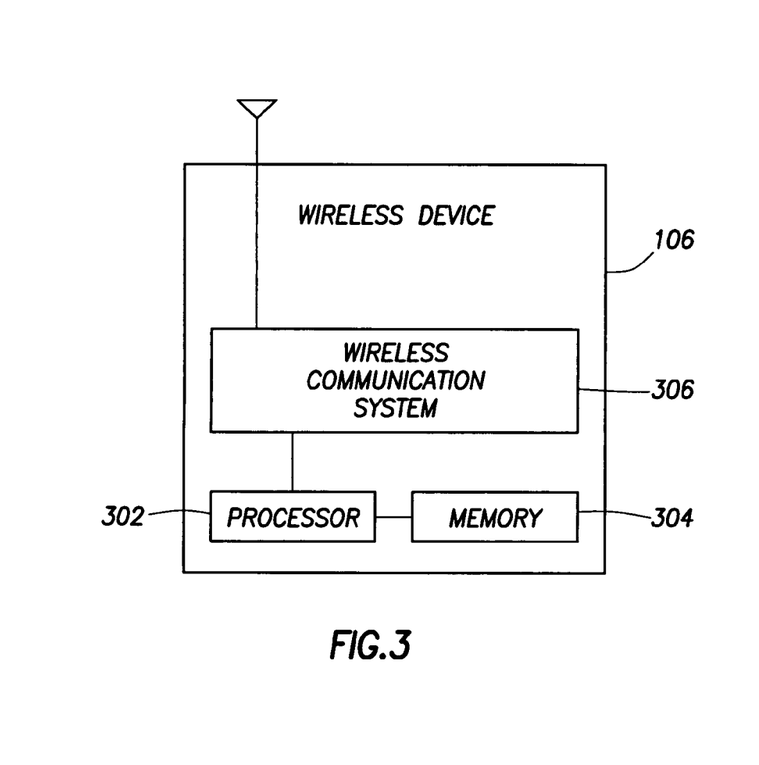
FIG. 3 is a block diagram of one embodiment of a wireless device that may be used with the system of FIG. 1.

Referring to FIG. 3, one embodiment of the wireless device 106 of FIG. 1 is illustrated. The wireless device 106 includes a processor 302, a memory 304, and a wireless communication system 306. It is understood that the wireless device can be any mobile device, including cellular phones, personal digital assistants, and laptop computers. An operating system may be used to control the wireless device 106 and provide a user interface by which a user of the device can access and utilize various functions.

The memory 304 of the wireless device 106 includes a binary image of the executable instructions and data contained within the wireless device, although it is noted that not all instructions and data may be included in the image. In the present example, the image is a monolithic image that contains the instructions and data in a static relationship that is created prior to being transferred to the wireless device.

Although such an image is often used in a device having a relatively simple operating system that does not support dynamic linking (e.g., dynamic link libraries (DLLs) or dynamic shared objects (DSOs)), the use of a static monolithic image creates a number of problems when updating the wireless device 106. The problems often stem from image updates that occur when the image present on a device is updated with a new image. When an image update occurs, the differences between the image on the device and the new image that is to be transferred to the device are referred to as the image delta (e.g., the amount of change) between the two images.

One such problem is a reference change propagation problem that occurs when an update of the image causes a change in a reference between two portions of the image. Because the image is static, altering a portion of the image can break the image's functionality, as calls may be made to program modules that are no longer at the same address.

The reference change propagation problem is not generally an issue with operating systems that support dynamic linking (e.g., through the use of DLLs or DSOs). As is known, a DLL may generally be defined as a file containing executable code and/or data that is bound to a program at load time or run time, rather than during linking. Multiple applications may share the code and data in a DLL simultaneously. DLLs are associated with the WINDOWS™ operating system (WINDOWS™ is a registered trademark of Microsoft Corp. of Redmond, Wash.). A DSO may be generally defined as a mechanism that provides a way to build a piece of program code in a special format for loading at run time into the address space of an executable program. The DSO gets knowledge of the executable program symbol set as if it had been statically linked with it. DSOs are associated with the UNIX/LINUX operating systems.

The lack of support for DLLs and DSOs may cause a problem when updates are made to the image. Because the monolithic image is a fixed binary representation of the instructions and data, the addresses of various elements are static once the image is complete. This makes it difficult to provide incremental updates to the image, as addresses may change when such updates occur. For example, a subroutine within the image is associated with a fixed address when the image is created. This address is inserted into other portions of the image that may need to call the subroutine. However, an update may move the subroutine from the original address to a new address. Because the other portions of the image are statically linked to the original address, they will no longer be able to call the subroutine and an error may occur. Accordingly, this inability to propagate reference changes throughout the monolithic image while performing incremental updates may cause serious problems in the operation of the wireless device. This problem is illustrated in greater detail in FIGS. 4a-4c.

Figure 4A:
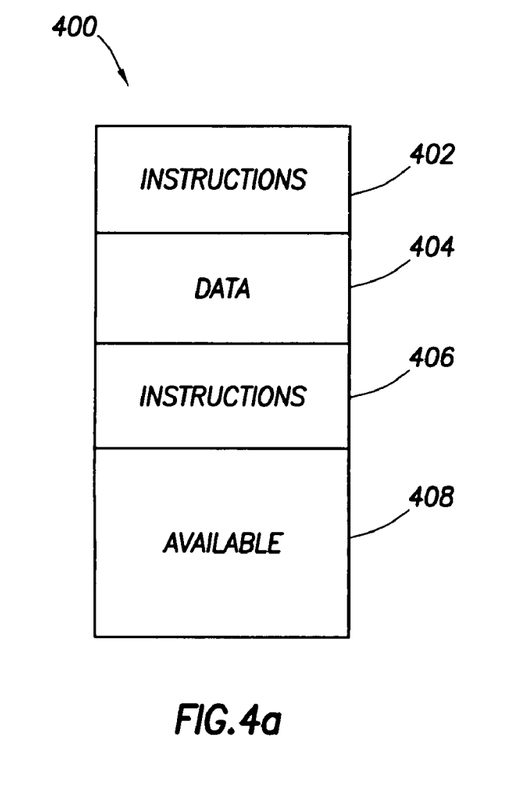
FIGS. 4a-4c illustrate various embodiments of a memory containing a monolithic image.

Referring to FIG. 4a, one embodiment of a monolithic image 400 is illustrated. The image 400 includes instruction portions 402 and 406, and data portion 404. It in understood that the portions 402, 404, and 406 are for purposes of illustration only, and that any combination or organization of instructions and data may be provided. As illustrated, each portion 402, 404, and 406 of the monolithic image abuts the next portion, and there is an available portion 408 of memory following and contiguous with the instruction portion 406. However, if any portion other than the portion 406 is updated, there is no available memory in which the update can be stored contiguously with the portion being updated.

Figure 4B:
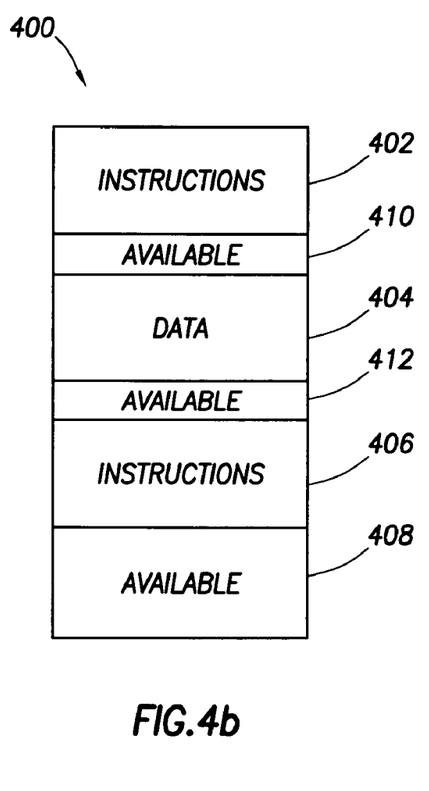

With additional reference to FIG. 4b, the image of FIG. 4a is illustrated with a segmented linking structure. The segmented linking structure breaks the image 400 into various portions (e.g., the portions 402, 404, and 408) and separates each portion with a block of available memory. For example, there is an available portion 410 contiguous to the instruction portion 402, an available portion 412 contiguous to the instruction portion 404, and the previously described available portion 408. It is noted that the available portion 408 is now smaller due to the existence of the available portions 410 and 412. The available portions allow for some expansion of the portions 402 and 404 without the need to recreate the entire monolithic image. This solution may be feasible in some situations, but fails to solve the reference change propagation problem because the segments remain linked and is generally unable to solve the problem that occurs when the update needs more memory than has been reserved, as is illustrated in FIG. 4c.

Figure 4C:
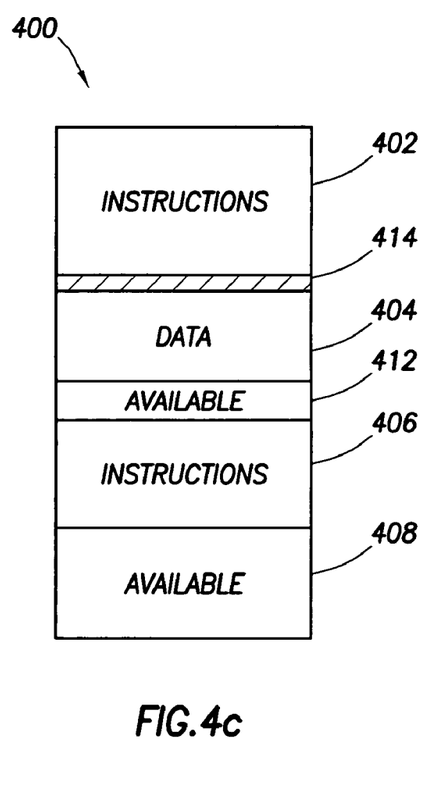

With additional reference to FIG. 4c, the instruction portion 202 requires more space than originally allotted in the available portion 412. Accordingly, if the portion 202 is to remain as a contiguous block, it will overlap with the data portion 404 as indicated by the overlap portion 414. In the present example, the portion 414 may overwrite the portion 404, the portion 414 may be broken into a non-contiguous portion and stored partly in non-contiguous available memory, or the portion 404 will have to be moved. Obviously, overwriting the beginning of the portion 404 may destroy the functionality. As previously described, moving the portion 404 may also harm the functionality as statically linked references will be broken.

Although the segmented linking structure is generally a better solution than using an image file without the available contiguous memory spaces provided by segmented linking, the structure does not satisfactorily solve the problems presented by the monolithic image. For example, to generate the segmented linking structure, a file such as a scatter file may be used. As is known, a scatter file is used to tell a linker where to load files or objects in memory. It is generally time consuming to generate the scatter file. Furthermore, the segmented linking structure tends to consume relatively large amounts of memory, as the available spaces left between segments should be large enough to accept an expected size increase in the corresponding segment. Even then, the available spaces may overflow relatively quickly due to updates and bug fixes, which means that a new scatter file has to be generated. Moving a function between segments may also require that a new scatter file be generated. The complexity and free memory required for the segmented linking structure are generally proportional to the code size. It is generally not possible to perform segmented linking with respect to third party libraries. In addition, the segmented linking structure maintains references between segments, so modifying a segment may result in needing to update all references in the image. For these and other reasons, changes to read-write data, read only data, and uninitialized data may result in large changes to the image.

Generally, there is little flexibility available for the software represented by the monolithic image. The image is created using tools outside of the wireless device and then transferred to the wireless device when complete. Because of the wireless device's relatively simple operating system and the use of a monolithic image, updates such as additional features and bug fixes may require that the entire image be modified and transferred to the wireless device. This is often impractical for a number of reasons. Not only is it impractical to utilize a customer's bandwidth for a lengthy period of time, but governmental regulations may limit the amount of time that an update may take. For example, governmentally mandated 911 restrictions may require that an update take no more than five minutes. As such, updating large portions of an existing image on a mobile device is often unfeasible.

Figure 5:
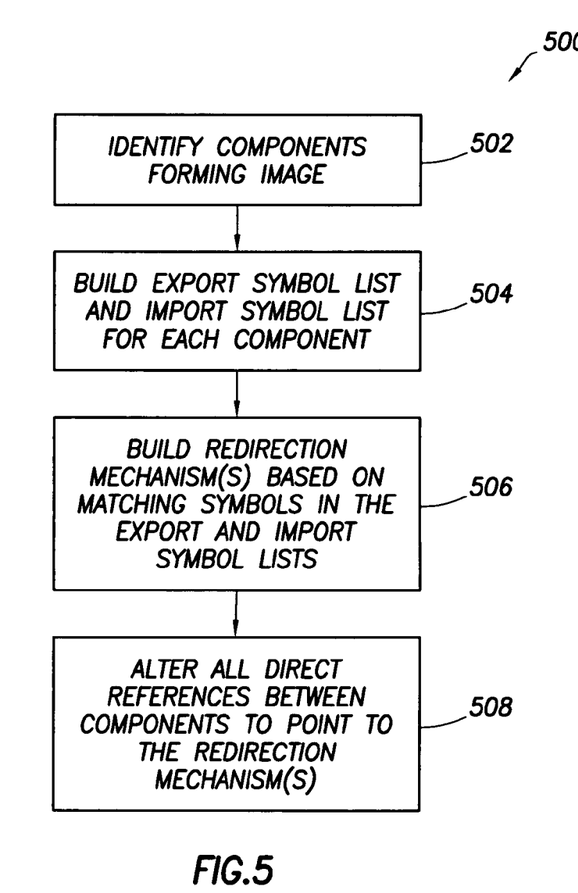
FIG. 5 is a flowchart of one embodiment of a method for providing a redirection mechanism for a static monolithic image.

Referring to FIG. 5, a method 500 illustrates one embodiment of a process for handling the reference change propagation problem when creating a static monolithic image. In step 502, the method 500 identifies multiple components that make up the image. As will be described later in greater detail, the components represent modules that form the image and may have little or no correspondence to the segments of a segmented linking structure that would be formed from the same image. A component or module may be a default type or may be user defined.

In step 504, an export symbol list and an import symbol list are built for each component. The export symbol list contains all symbols (e.g., variables and functions) that are available outside of the component. The import symbol list contains all symbols that the component will need to call from other components. It is understood that an export symbol list and an import symbol list are used for purposes of example, and that other processes for identifying and tracking the symbols may be used. For example, a single list containing all export symbols and their corresponding components may be used, and another list may contain all import symbols and their corresponding components. In another example, the lists may be combined into a single list. Other mechanisms for identifying symbols exportable from a component and symbols imported by a component from another component may also be used.

In step 506, one or more redirection mechanisms (e.g., jump tables or veneers) are built based on the export and import symbol lists. A jump table is an array containing the addresses of subroutines (e.g., provides an indirect reference to each subroutine). Accordingly, if a component references a particular element of the array, the component will be redirected to the corresponding subroutine. A veneer is a short sequence of instructions used to make a subroutine call. The calling component transfers control to the veneer using an instruction such as a limited-range branch instruction. The veneer then transfers control to the destination subroutine by a mechanism that permits a transfer to the appropriate destination. Accordingly, both a jump table and a veneer enable redirection. It is understood that other redirection mechanisms may be substituted, although some modifications may be needed depending on the particular redirection mechanism used.

To build the redirection mechanism, the method 500 examines the export and import symbol lists to identify symbols that are contained in both an export symbol list and an import symbol list. Only symbols contained in both an export symbol list and an import symbol list are included in the redirection mechanism. In step 508, all direct references between components are altered to point to the redirection mechanism. For example, a component that contains a direct reference call to a function in another component would be modified to contain a reference call to the redirection mechanism, which would then redirect the calling component to the appropriate function. Accordingly, all direct references between components are removed and the image is provided with pseudo-DLL functionality. Any change to a component may be reflected by changing the appropriate address in the redirection mechanism, rather than changing each component that requires access to the changed component.

Figure 6:
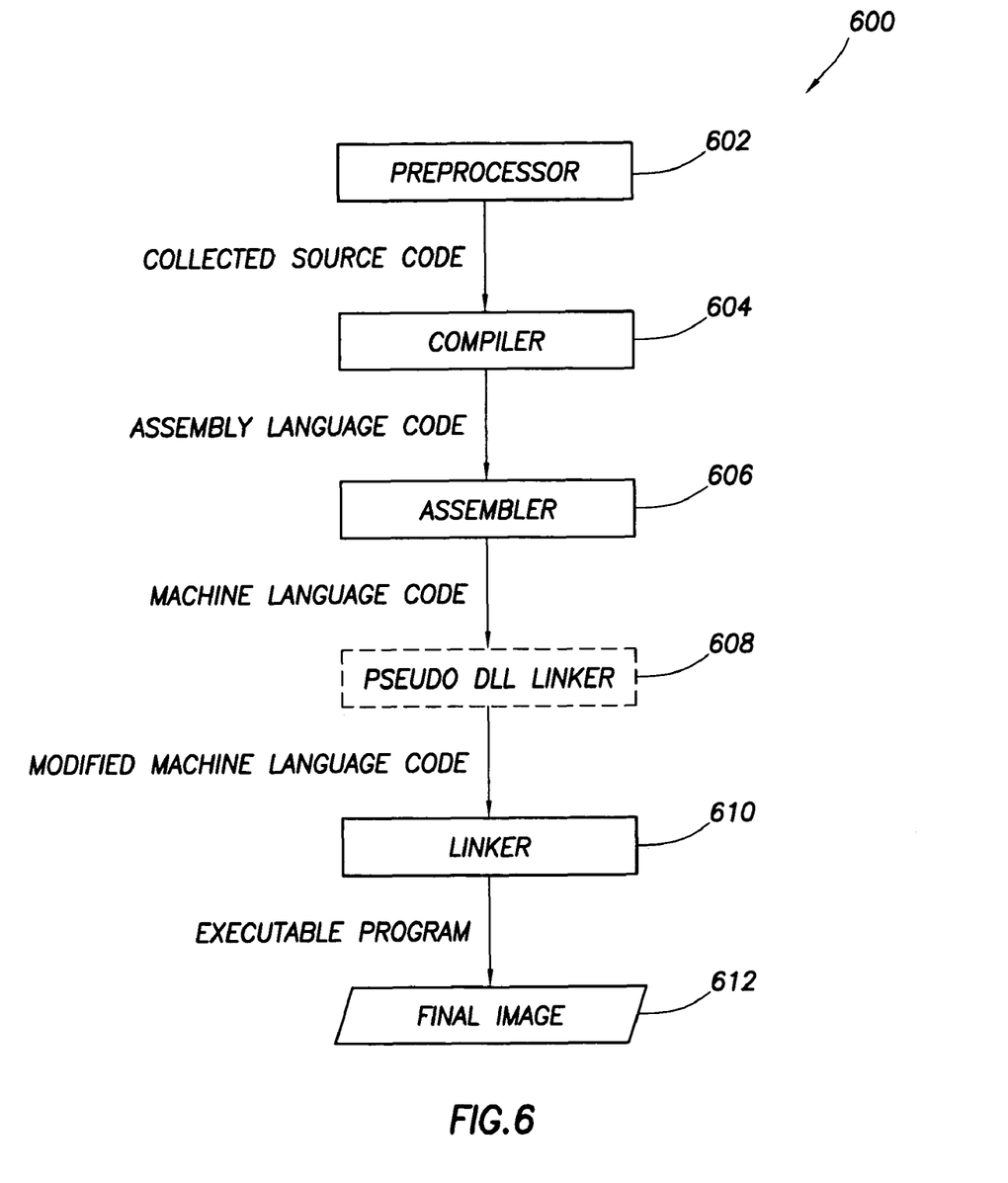
FIG. 6 illustrates one embodiment of compilation system for producing an executable file.

Referring to FIG. 6, one embodiment of a compiling system 600 uses various modules for compiling an executable program 612 in the image creation system 102 of FIG. 1. A software program is generally written using a high level language (i.e., source code) and converted into machine readable language (i.e., object code). Although some variations in terminology and actual processing may occur, the compiling system 600 provides modules used in a common conversion process including a preprocessor 602, a compiler 604, an assembler 606, and a linker 610. The preprocessor 602, compiler 604, assembler 606, and linker 610 are commonly used modules that are generally associated with a specific programming language and/or platform. A pseudo DLL linker 608 is inserted into the process between the assembler 606 and linker 610 to modify the output of the assembler before linking, as is discussed below in greater detail. This placement enables the pseudo DLL linker 608, for example, to manipulate the various files before they become too large to easily manipulate.

The preprocessor 602 is responsible for collecting different parts of a source program that is to be compiled. The compiler 604 takes the output of the preprocessor 602 and converts it into assembly language code, and the assembler 606 translates the assembly language code into machine language code. Traditionally, the linker 610 would then take the machine language code, identify any libraries or other external modules referred to by the machine language code, and bind these modules to the machine language code to form the final image 612.

In the present example, the pseudo DLL linker 608 receives the machine language code produced by the assembler 606, modifies the code, and then calls the linker 610 to link the modified code. It is noted that the assembler 606 and linker 610 may be basically unchanged from a system that does not include the pseudo DLL linker 608. For example, the assembler 606 may be modified to call the pseudo DLL linker 608 rather than the linker 610, or the call from the assembler may be intercepted by the pseudo DLL linker. In other embodiments, the assembler output may be written to a file and the pseudo DLL linker 608 may operate on the file prior to calling the linker 610. The linker 610 may be unchanged.

Because of the need to identify and manipulate code at the machine code level and because machine code is generally created for a specific platform/architecture, it is understood that a different pseudo DLL linker 608 may need to be written for each platform for which the pseudo DLL functionality is provided. For example, different pseudo DLL linkers may be provided as plug-ins or modules to a programming tool used to manipulate object code, such as BFD (Binary File Descriptor). As is known, BFD is a software tool that uses a library to allow an application to use a set of routines to operate on object files despite the format of the object files. A new object file format can be supported by creating a new BFD back end and adding it to the BFD library. BFD is split into a front end and one or more back ends, with one back end for each object file format. The front end provides a user interface and manages memory and various canonical data structures, as well as deciding which back end to use and when to call back end routines. Each back end provides a set of calls that the front end can use to maintain its canonical form. Accordingly, each pseudo DLL linker for a particular platform/architecture can be provided as a back end to a tool such as BFD.

Figure 7:
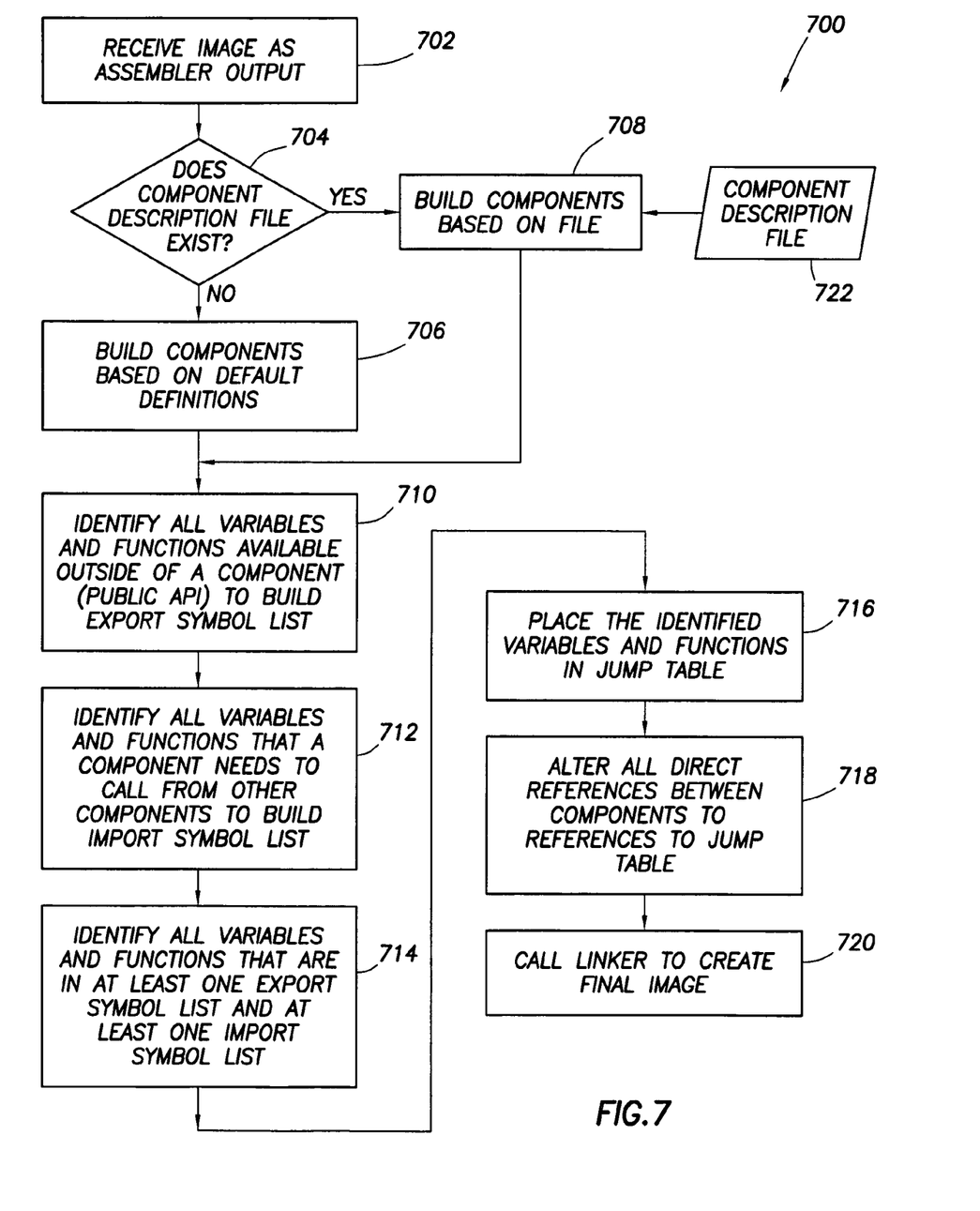
FIG. 7 is a flowchart of one embodiment of a method for providing pseudo DLL functionality to a static monolithic image.

Referring to FIG. 7, in another embodiment, a method 700 may be used to handle the problem caused when changes to a monolithic image impact direct references present in the image. In the present example, the method 700 occurs between the assembling process and the linking process during compilation of the final image, as illustrated above with respect to FIG. 6. After the method 700 is complete, the final image is a static, monolithic image with a redirection mechanism. Although a jump table is used as the redirection mechanism in the present example for purposes of illustration, it is understood that the jump table may be replaced by other redirection mechanisms (e.g., veneer(s)), although some modifications may be needed depending on the particular redirection mechanism used.

In step 702, the image is received from an assembler. The pseudo DLL linker should be able to identify and manipulate portions of the machine language code produced by the assembler. As described above, a different pseudo DLL linker may be needed for each particular platform/architecture supported.

In step 704, the method 700 determines whether a definition file, such as a component description file, exists. The component description file enables a user to define some or all of the components that will be used to form the final image. In the present example, a component is not limited to a file or object as defined by the assembler (although it may be defined as such if desired). Each component may be a collection of modules, where a module may be a relocatable object file, and the collection may be predefined (e.g., an archive). For example, an archive (often having a name of *.a or *.lib) may be a library that includes multiple modules, and the library itself may be identified as a component. To identify components, the method 700 examines the machine language code to identify affinities between various pieces of code and then, unless otherwise directed, builds the components based on those affinities.

If a component description file does not exist, the method 700 proceeds to step 706, where it identifies and builds the components using default definitions. For example, a default definition may define a component as a collection of related modules (e.g., a single library or other defined collection), with any non-library files combined into a single component.

Accordingly, if there are two libraries and multiple non-library files, there would be three components identified in step 706.

However, if a component description file does exist, the method 700 moves to step 708, where it uses the component description file 722 to identify and build the components as described in the file. This enables a user to define a component as desired. For example, the user may combine multiple libraries into a single component, divide a library into multiple components, etc. It is understood that user-defined and default definitions may be mixed, with a user defining certain components and allowing other components to be defined according to the default definitions. For purposes of example, with additional reference to FIG. 4a, the instruction portion 402 and data portion 404 are a component ("Component A"), and instruction portion 406 is a component ("Component B").

In step 710, the method 700 builds an export symbol list for each component. In the present example, a symbol is a variable or function. The export symbol list is a list of all symbols within a component that are accessible to another component (e.g., any symbol associated with a component's application programming interface (API)).

Continuing the previous example of FIG. 4a, assume that the instruction portion 402 includes three functions func1, func2, and func3, the data portion 404 includes a variable X, and the instruction portion 406 includes a function func4 and variables Y and Z. This is illustrated below in Table 1.

TABLE 1

|  | Component A | | Component B |
|---|---|---|---|
|  | Instruction portion 402 | Data portion 404 | (instruction portion 406) |
| Total functions/ variables | func1, func2, func3 | X, Y | func4, Z |

Functions func1 and func3 are both accessible outside of component A (i.e.; both func1 and func3 are in component A's API), but func2 is not. Variable X is available outside of Component A, but Y is not. Function func4 and variable Z are both accessible outside of component B. Each of the functions and variables that are available outside of their component are placed in that component's export list. This is illustrated below in Table 2.

TABLE 2

|  | Component A | | Component B |
|---|---|---|---|
|  | Instruction portion 402 | Data portion 404 | (instruction portion 406) |
| Total functions/ variables | func1, func2, func3 | X, Y | func4, Z |
| Export symbol list | func1, func3, X | | func4, Z |

In step 712, the method 700 builds an import symbol list for each component. The import symbol list is a list of all symbols that a component may need to call from other components. Together, the export and import symbol lists contain all possible references between components.

Continuing the previous example, functions func1 and func2 only call functions func1, func2, and func3 (e.g., the calls are internal to Component A), but func3 makes a call to func4 that is contained in component B. In addition, component A needs access to variable X (within component A) and component Z (within component B). Component B needs access to func1 from component A. Each of the functions and variables that are called by a component from another component are placed in the calling component's import list. For example, variable Z will be placed in Component A's import list because it is contained within Component B, but variable X will not be in the import list because it is contained within the same component (although a different module). This is illustrated below in Table 3.

TABLE 3

|  | Component A | | Component B |
|---|---|---|---|
|  | Instruction portion 402 | Data portion 404 | (instruction portion 406) |
| Total functions/ variables | func1, func2, func3 | X, Y | func4, Z |
| Export symbol list | func1, func3, X | | func4, Z |
| Import symbol list | func4, Z | | func1 |

In step 714, all symbols that are in both an export symbol list and an import symbol list are identified and, in step 716, the identified symbols and their corresponding addresses are placed in the jump table. Accordingly, the jump table only contains a reference to each export symbol that corresponds to an input symbol. Only a call to a symbol outside of the calling component (e.g., any call that does not reference a symbol contained within the component itself) has a reference in the jump table.

Continuing the previous example, although func1 and func3 are both accessible outside of component A, only func1 will ever be called in the current program because no other component needs to call func3. Accordingly, func3 will not be placed in the jump table. Function func4 and Z will also be placed in the jump table as they both may be called by external components. This is illustrated below in Table 4.

TABLE 4

|  | Component A | | Component B |
|---|---|---|---|
|  | Instruction portion 402 | Data portion 404 | (instruction portion 406) |
| Total functions/ variables | func1, func2, func3 | X, Y | func4, Z |
| Export symbol list | func1, func3, X | | func4, Z |
| Import symbol list | func4, Z | | func1 |
| Symbols in jump table | func1, func4, Z | | |

In step 718, the method 700 alters all direct references between components to refer to the jump table. For example, all references in Component A to func4 and Z will be modified to refer to the jump table rather than directly to Component B, and all references in Component B to func1 will be modified to refer to the jump table rather than directly to Component A. Accordingly, changes to the image that result in a different address for func1, func4, or Z may be fixed by modifying the corresponding redirection address in the jump table instead of needing to modify each direct reference in the calling component.

In step 720, a linker (e.g., the linker 610 of FIG. 6) is called to link the final image. The final image will include the modified components and the jump table. Once complete, the image may be transferred to a wireless device.

Figure 8A:
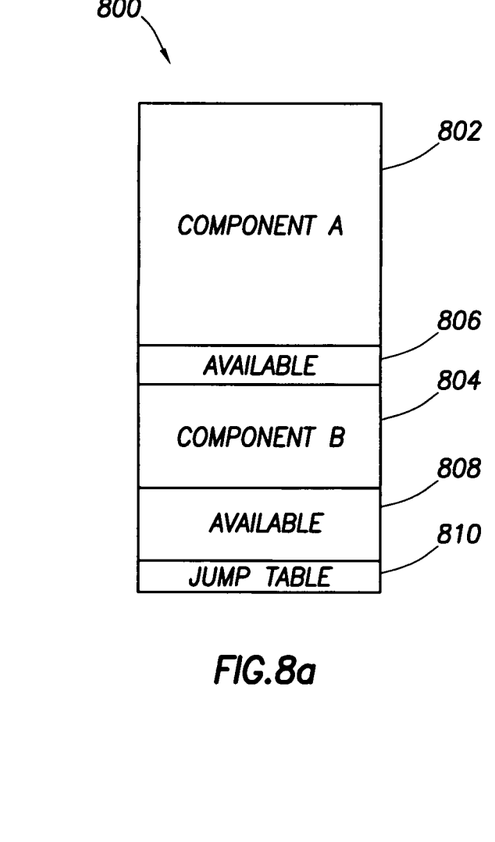
FIGS. 8a and 8b illustrate various embodiments of a memory containing a monolithic image and a redirection mechanism.
Figure 8B:
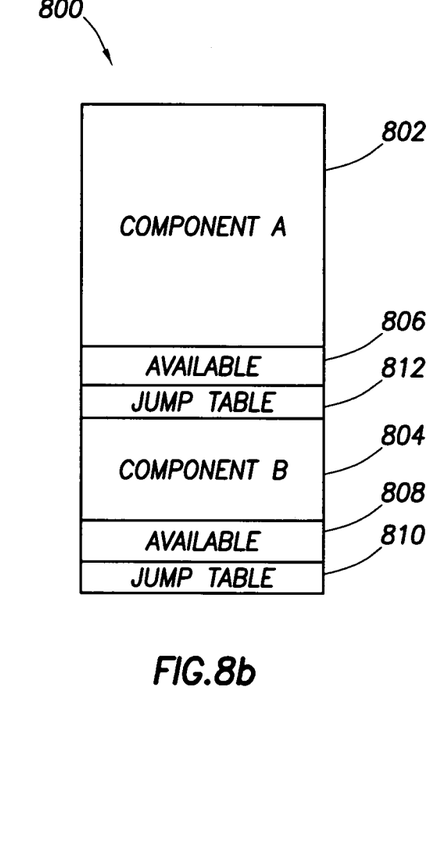

With additional reference to FIG. 8a, in the present example, a monolithic image 800 includes Component A (denoted by reference number 802) and Component B (denoted by reference number 804). Component A is associated with a contiguous memory space 806 and component B is associated with a contiguous memory space 808. The memory spaces 806 and 808 provide their corresponding components with some contiguous expansion room. There may be a single jump table 810 for the monolithic image 800, or multiple jump tables may be used (as illustrated by the jump tables 810 and 812 in FIG. 8b). For example, in some embodiments, a small jump table may require less space because it is able to provide an address corresponding to a symbol's location and a jump instruction in a single instruction. In contrast, a large jump table may require separate load address and jump instructions. If smaller jump tables are used, it is understood that the symbols contained in each table may be divided so that a particular component need only utilize one or two jump tables. However, any combination of symbols and jump tables may be used.

For purposes of example, the image itself may be approximately twenty-two megabytes (MB), although it is understood that any size of image may be used. Each jump table (assuming a jump table for each component) may be approximately four kilobytes (KB). The size of the available memory spaces 806 and 808 may be approximately four to sixteen KB and may be located after each four MB space containing one or more components. The remaining memory may constitute a contiguous memory space of between approximately two hundred and fifty KB and eight hundred KB. It is understood that these values are for illustration only, and that the size of the image, jump table(s), available memory spaces, and remaining memory may be of any size desired.

Figure 9:
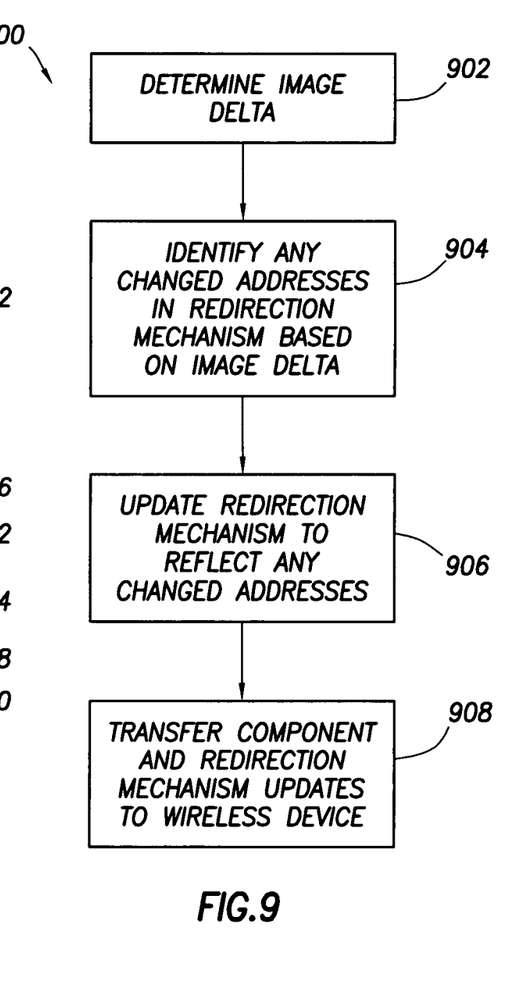
FIG. 9 is a flowchart of one embodiment of a method for updating an existing monolithic image having a redirection mechanism.

Referring to FIG. 9, in another embodiment, a method 900 may be used to patch (i.e., update) an existing image previously created with a redirection mechanism and stored on a wireless device. The method 900 may be executed, for example, on the image creation system 102 of FIG. 1. In step 902, the method 900 determines an image delta between the existing image and a new image to identify the differences between the two images. In step 904, any change to the address of any symbol contained in the image's redirection mechanism is identified based on the image delta. In step 906, the addresses in the redirection mechanism are updated to reflect the identified changes. In step 908, any component and redirection mechanism updates are transferred to the wireless device. One process by which the size of the patch may be minimized is described in greater detail in previously incorporated U.S. Provisional Patent Ser. No. 11/333,847 and entitled "SYSTEM AND METHOD FOR A PATCH MINIMIZATION TOOL."

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. Accordingly, all such modifications are intended to be included within the scope of this disclosure.

What is claimed is:

1. A method for providing a monolithic image for use in a wireless device, the method performed by an image creation system having a processor and a memory unit, the method comprising:
    identifying by the image creation system a plurality of components forming an image represented in machine code;
    for each component of the plurality of components, building by the image creation system an export symbol list containing all symbols within the component that are accessible to other components and an import symbol list containing all symbols within other components that are needed by the component;
    building by the image creation system a redirection mechanism containing an indirect reference to each symbol in each component's export symbol list that is in the import symbol list of at least one other component;
    for each component of the plurality of components, altering by the image creation system each direct reference to a symbol in another component to refer to the indirect reference associated with the symbol in the redirection mechanism, wherein references internal to a component are not altered; and
    creating by the image creation system a final image containing the altered components and the redirection mechanism.

2. The method of claim 1 further comprising defining at least one criterion for a component in a component description file for use in identifying the plurality of components.

3. The method of claim 2 further comprising determining whether the component description file exists for use in identifying the plurality of components.

4. The method of claim 3 further comprising using at least one default component definition to identify the plurality of components if there is no component description file.

5. The method of claim 1 wherein building the redirection mechanism includes creating at least one jump table.

6. The method of claim 1 wherein building the redirection mechanism includes creating at least one veneer.

7. The method of claim 1 wherein the image represented in machine code is received directly from an assembler and wherein the final image is created by calling a linker normally called directly by the assembler.

8. The method of claim 1 further comprising transferring the image to the wireless device using a firmware over the air process.

9. A method for providing an executable image for a mobile device, the method performed by an image creation system having a processor and a memory unit, the method comprising:
    receiving by the image creation system an image from an assembler;
    identifying by the image creation system a plurality of components forming the image;
    identifying by the image creation system all symbols exportable from each component and all symbols imported by each component from another component;
    building by the image creation system a redirection mechanism containing an address of each symbol exported by a component that is imported by another component;
    modifying by the image creation system each component to alter each direct reference to a symbol associated with another component to a reference to the redirection mechanism; and
    calling by the image creation system a linker to link a final image based on the modified components.

10. The method of claim 9 wherein identifying the plurality of components uses at least one component definition contained in a component description file prepared by a user.

11. The method of claim 9 wherein identifying the plurality of components uses at least one component definition contained in a default description file.

12. The method of claim 9 wherein a symbol is a variable or a function.

13. The method of claim 9 wherein at least one of the plurality of components includes a plurality of modules, the method further comprising grouping the plurality of modules to form the component.

14. A method performed by an image creation system having a processor and a memory unit, the method comprising:
- building by the image creation system at least first and second components from a plurality of modules forming an image received in machine language code;
- building by the image creation system an export symbol list and an import symbol list for each of the first and second components;
- comparing by the image creation system the first component's export symbol list with the second component's import symbol list and comparing the second component's export symbol list with the first component's import symbol list to identify any symbols that are on the export list of one of the first and second components and the import list of the other of the first and second components;
- building by the image creation system a redirection mechanism containing a location of each identified symbol; and
- modifying by the image creation system the first component to change each reference to an export symbol of the second component to a reference to the redirection mechanism and modifying the second component to change each reference to an export symbol of the first component to a reference to the redirection mechanism.

15. The method of claim 14 further comprising calling a linker to create an executable image based on the modified components and the redirection mechanism.

16. The method of claim 14 further comprising organizing the plurality of modules into the first and second component based on a predefined set of component definitions.

17. A system memory storing a static monolithic image for a mobile device that is controlled by an operating system that does not support dynamic linking or dynamic sharing, the image comprising:
- at least one redirection mechanism containing an address of each symbol within the image that is imported by any component forming the image from any other component forming the image; and
- a plurality of components, wherein each component has a direct reference to any symbol contained by the component itself, and has a reference to the redirection mechanism for any symbol imported from another component.

18. The system memory of claim 17 wherein each symbol is a variable or a function.

19. The system memory of claim 17 wherein the redirection mechanism includes at least one jump table.

20. The system memory of claim 17 wherein the redirection mechanism includes at least one veneer.

21. A system comprising:
- a processor;
- a memory unit coupled to the processor;
- and a plurality of instructions stored on the memory unit for execution by the processor, the instructions including instructions for:
  - converting a monolithic image for use with a wireless device from assembly code to machine code;
  - building a plurality of components based on modules identified in the machine code;
  - identifying each symbol exportable by each component and each symbol imported by each component;
  - building a redirection mechanism containing every symbol that is exportable by one component and imported by another component;
  - modifying each component to alter each reference to an export symbol associated with another component to a reference to the redirection mechanism; and
  - linking the modified components and the redirection mechanism to create a final version of the monolithic image.

22. The system of claim 21 further comprising means for transferring the final version of the monolithic image to the wireless device.

* * * * *